United States Patent [19]

Timmermans et al.

[11] Patent Number: 4,471,966
[45] Date of Patent: Sep. 18, 1984

[54] APPARATUS FORMING A PRESSURE SEAL FOR SEPARATING TWO CHAMBERS CONTAINING FLUID PLACED UNDER DIFFERENT PRESSURES

[75] Inventors: Francis Timmermans, Jeumont; Jean Vandervorst, Ferriere la Grande, both of France

[73] Assignee: Jeumont Schneider, Puteaux, France

[21] Appl. No.: 405,248

[22] Filed: Aug. 4, 1982

[30] Foreign Application Priority Data

Aug. 6, 1981 [FR] France .................. 81 15258

[51] Int. Cl.³ ............................... F16J 15/40
[52] U.S. Cl. ................................. 277/27; 277/3; 277/74; 277/173
[58] Field of Search ............. 384/99, 100, 112, 121, 384/123, 130, 132; 277/3, 70, 71, 72 R, 74, 27, 72 FM, 79, 135, 173

[56] References Cited

U.S. PATENT DOCUMENTS

| | | | |
|---|---|---|---|
| 3,033,577 | 5/1962 | Speiss | 277/74 X |
| 3,093,382 | 6/1963 | Macks | 277/74 X |
| 3,179,422 | 4/1965 | Phillips | 277/3 |
| 3,759,532 | 9/1973 | Lindleboom | 277/74 X |
| 3,804,424 | 3/1974 | Gardner | 277/96.1 X |
| 4,071,253 | 1/1978 | Heinan et al. | 277/74 X |
| 4,083,647 | 4/1978 | Tatkov et al. | 277/3 X |
| 4,103,899 | 8/1978 | Turner | 277/3 X |

FOREIGN PATENT DOCUMENTS

| | | |
|---|---|---|
| 1650056 | 8/1970 | Fed. Rep. of Germany . |
| 2248572 | 4/1974 | Fed. Rep. of Germany . |
| 1422767 | 11/1965 | France . |
| 2000565 | 9/1969 | France . |
| 2070257 | 9/1971 | France . |
| 734685 | 8/1955 | United Kingdom ............ 277/3 |

Primary Examiner—Stuart S. Levy
Assistant Examiner—David Werner
Attorney, Agent, or Firm—Rines and Rines; Shapiro and Shapiro

[57] ABSTRACT

To increase performance levels of pressurized water pumps, a hydrostatic joint arrangement (pressure seal) permits a controlled flow to occur between two chambers containing the same fluid placed under different pressures. This arrangement includes a metal bearing (3) attached to a rotary movable shaft (4) and a float (5) which is capable of unrestricted axial movement, whereby minimum flow of fluid between the bearing and the float can produce sufficient force for gradually raising the float (5), while maintaining a pressure seal. The bottom portion (7) of the float (5) contains openings (8) which are connected to a source of pressurized fluid by means of intake ducts (9), thereby to provide fluid flow between the bearing and the float regardless of the pressure difference between the two chambers.

2 Claims, 1 Drawing Figure

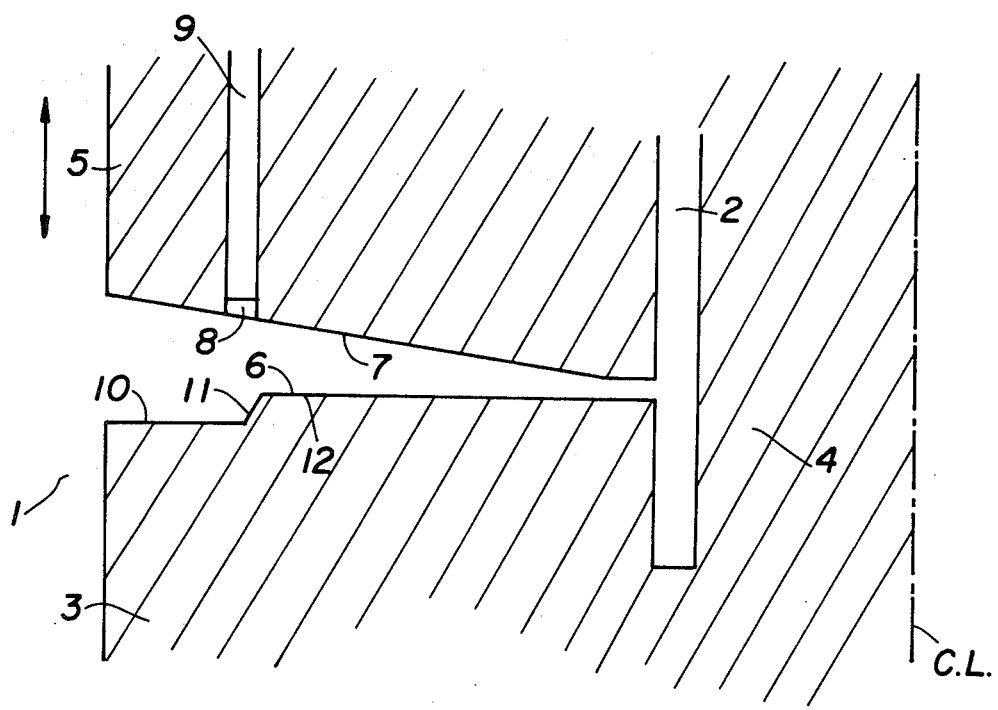

APPARATUS FORMING A PRESSURE SEAL FOR SEPARATING TWO CHAMBERS CONTAINING FLUID PLACED UNDER DIFFERENT PRESSURES

BACKGROUND OF THE INVENTION

The present invention pertains to an axially symmetrical apparatus intended to separate one annular chamber filled with a fluid placed under high pressure from another coaxial annular chamber containing the same fluid under low pressure, with motion being imparted to the walls of said chambers.

This type of arrangement is especially applicable for fluid pumps with vertical shafts, and particularly for pressurized water pumps.

Hydrostatic joint arrangements providing pressure seals in pressurized water pumps, for example, for controlled releasing of fluid are not uncommon. For example, French Pat. Nos. 1,422,767, 1,435,568, or 1,459,107 describe several versions of such arrangements. Usually, the aforementioned arrangements include a metal bearing attached to the shaft, with the upper portion of the bearing ring (hereinafter referred to as a "bearing") forming a wall upon which the bottom portion of a floating ring (hereinafter referred to as a "float") can rest, thereby forming a pressure seal. The float can move in an axial direction, and its surface possesses a shape which permits a minimum flow of fluid between the float and the metal bearing to furnish sufficient force to ensure gradual lifting of the float during operation, in such a manner as to prevent damage to components such as the bearing situated opposite the float, while also providing a pressure seal between the two chambers filled with fluid.

Nevertheless, the aforementioned arrangements are characterized by two fundamental disadvantages. On the one hand, any decrease in fluid pressure inside the high pressure chamber can cause the components forming the pressure seal to be affected by wear and tear. On the other hand, the outlet for the fluid which is formed by the oppositely situated components constituting the pressure seal displays a tendency to become clogged, as a result of particles transported within the fluid.

The purpose of the present invention is to overcome these disadvantages without significantly changing the general structure of the aforementioned hydrostatic arrangement.

BRIEF SUMMARY OF THE INVENTION

In accordance with the present invention, intake openings are provided within the bottom portion of the float, and these openings are connected by intake ducts to a source of fluid placed under a pressure which is normally higher than the pressure applied to the highly pressurized fluid contained within the first chamber.

It is preferable for the wall of the metal bearing whose topmost portion supports the float to consist of two concentric rings situated within different parallel end planes, and for these rings to be interconnected by an annular area possessing the shape of a truncated cone, which is essentially situated opposite the intake openings located within the bottom portion of the float. The shape of the aforementioned wall makes it possible to regulate distribution of the fluid between the two chambers, as it flows through the previously cited openings.

BRIEF DESCRIPTION OF THE DRAWING

It is possible to understand the invention more fully and to recognize other purposes, advantages, and characteristics of the invention more clearly on the basis of the description furnished hereinafter, which is accompanied by an illustrative drawing. The sole FIGURE is a schematic representation of an axially symmetrical hydrostatic arrangement in accordance with the present invention, as shown in an axial vertical section (only the portion to one side of the center line C.L. being shown).

DETAILED DESCRIPTION OF THE PREFERRED EMBODIMENT

The arrangement shown in the drawing is intended to provide a pressure seal between a first chamber (1) and a second chamber (2). In the version intended for a pump with a vertical shaft (4), pressure upon the fluid contained within the first chamber is usually on the order of $155 \times 10^5$ Pascals, whereas pressure upon the fluid contained within the other chamber is on the order of $10^5$ Pascals.

The pressure seal arrangement consists of a metal bearing (3) attached to the shaft (4), as well as a float (5) which can move freely in an axial direction toward and away from the bearing (3). The walls (6, 7) of the upper portion of the metal bearing and the bottom portion of the float (5) constitute a passage through which it is usually possible for fluid originating from the first chamber (1) to flow to chamber (2). The wall identified as (7) possesses a shape which allows gradual lifting of the float (5) by the flowing fluid, with the result that the float does not rub against the bearing (3) while the shaft is turning and while the first chamber (1) is pressurized. The height of the aforementioned passage in a pressurized water pump, can vary between approximately 60 microns upward and 10 microns downward. Untimely movement of the shaft when pressure within the first chamber is insufficient or during sudden depressurization of the first chamber can cause serious damage to the walls (6) and (7). In accordance with the present invention, it is possible for fluid to continue to flow through the aforementioned passage regardless of the pressure conditions which may exist inside the first chamber, because there are multiple outlet openings (8) adjacent to the wall (7) of the bottom portion of the float (5) and because these openings permit introduction of fluid to replace the fluid in the first chamber.

The aforementioned openings (8) are connected to intake ducts (9), and the opposite ends of these ducts are connected to a source of fluid placed under pressure which is usually higher than the pressure maintained inside the first chamber (1). As a result, fluid usually flows through these openings (8), and the walls (6) and (7) can only be damaged as a result of two simultaneous malfunctions within the system, i.e., loss of pressure in chamber (1) and cessation of flow through openings (8), so that the reliability of the hydrostatic arrangement is substantially increased.

In addition, prior filtering of fluid entering the ducts through the previously cited openings (8) can be performed, in order to prevent clogging of the narrowest portions of the ducts.

It is preferable for the surface of wall (6) of the metal bearing to consist of two concentric surface portions (10, 12) situated within respective planes which are essentially perpendicular to the axis of the shaft (4). These surface portions are connected to one another by a tapered surface portion in the shape of a truncated cone (11), which is essentially situated opposite the intake openings (8) located within the bottom portion (7) of the float (5).

The shape of the aforementioned wall permits adjustment of the distribution of fluid according to the previously cited openings (8). In accordance with one version of the present invention, the height of the area in the shape of a truncated cone is on the order of several hundredths of a millimeter, whereby 70 percent of the fluid entering through the openings (8) flows toward the first chamber (1) and 30 percent flows toward the second chamber (2).

For a pressurized water pump in accordance with the preceding description, it is necessary to provide a quantity of filtered water flowing through the openings (8) which constitutes approximately two cubic meters per hour.

Although only one version of the present invention has been described, it is obvious that any modifications of the same nature which may be introduced by technically knowledgeable persons would not constitute departures from the context of the present invention.

For example, the concentric rings (10, 12) which form the wall (6) of the metal bearing (3) need not be parallel to one another, and their shape may slightly resemble the shape of a truncated cone.

We claim:

1. Apparatus for separating a first annular chamber containing fluid under high pressure from another annular chamber containing the same fluid under low pressure, the chambers being disposed coaxially about a vertical rotary shaft, said apparatus including a bearing ring attached to the shaft and a floating ring capable of axial movement along the shaft toward and away from the bearing ring, the bearing ring having an upper wall and the floating ring having a lower wall opposite to said upper wall, said walls having surfaces shaped to permit circulation of said fluid therebetween and to provide a flow path between said first chamber and said second chamber when said floating ring moves axially away from said bearing ring, said surfaces being capable of coming together to provide a pressure seal between said chambers, said apparatus being characterized in that said floating ring has duct means connected to a source of pressure normally greater than the pressure in said first chamber and having outlet opening means at said lower wall surface for supplying fluid between said surfaces to maintain fluid flow therebetween, and further characterized in that the upper wall of said bearing ring comprises a pair of concentric surface portions spaced in the direction of the axis of said shaft and interconnected by a tapered surface portion positioned opposite said outlet opening means to distribute fluid from said opening means toward and away from said shaft.

2. Apparatus as claimed in claim 1, further characterized in that said tapered surface portion is conical.

* * * * *